United States Patent [19]

Stone

[11] Patent Number: 5,458,767
[45] Date of Patent: Oct. 17, 1995

[54] FUEL FILTER ASSEMBLY WITH DUAL FILTER MEDIA AND BY-PASS DEVICE

[75] Inventor: Walter H. Stone, Modesto, Calif.

[73] Assignee: Parker-Hannifin Corporation, Cleveland, Ohio

[21] Appl. No.: 288,511

[22] Filed: Aug. 10, 1994

[51] Int. Cl.⁶ .................................................. B01D 27/14
[52] U.S. Cl. ............................ 210/90; 210/130; 210/315; 210/438; 210/440; 210/502.1; 210/DIG. 5
[58] Field of Search .................................... 210/130, 315, 210/90, 502.1, DIG. 5, 314, 316, 438, 440, 489

[56] References Cited

U.S. PATENT DOCUMENTS

| | | |
|---|---|---|
| 1,407,763 | 2/1922 | Langston . |
| 1,468,906 | 9/1923 | Inman . |
| 1,746,336 | 2/1930 | Breer . |
| 2,071,529 | 2/1937 | Howard . |
| 2,431,782 | 12/1947 | Walton et al. . |
| 2,858,026 | 10/1958 | Lorimer . |
| 2,998,138 | 8/1961 | Mould et al. . |
| 3,040,894 | 6/1962 | Pall . |
| 3,056,503 | 10/1962 | Roosa . |
| 3,105,042 | 9/1963 | Roosa . |
| 3,229,817 | 1/1966 | Pall . |
| 3,232,437 | 2/1966 | Hultgren . |
| 3,270,884 | 9/1966 | Bremer ................................ 210/315 |
| 3,331,509 | 7/1967 | Gray, Jr. . |
| 3,363,762 | 1/1968 | Ensign . |
| 3,529,727 | 9/1970 | Bernhard . |
| 3,931,011 | 1/1976 | Richards et al. . |
| 4,035,306 | 7/1977 | Maddocks . |
| 4,038,189 | 7/1977 | Dison et al. . |
| 4,052,307 | 10/1977 | Humbert, Jr. . |
| 4,091,263 | 5/1978 | Richards et al. . |
| 4,094,791 | 6/1978 | Conrad . |
| 4,139,468 | 2/1979 | Rosaen . |
| 4,246,109 | 1/1981 | Manders . |
| 4,322,290 | 3/1982 | Carl . |
| 4,437,986 | 3/1984 | Hutchins et al. . |
| 4,477,345 | 10/1984 | Szlaga, Jr. . |
| 4,588,500 | 5/1986 | Sprenger et al. ........................ 210/100 |
| 4,619,764 | 10/1986 | Church et al. . |
| 4,732,671 | 3/1988 | Thornton et al. .......................... 210/90 |
| 4,740,299 | 4/1988 | Popoff et al. . |
| 4,787,949 | 11/1988 | Cole et al. . |
| 4,836,923 | 6/1989 | Popoff et al. . |
| 4,906,365 | 3/1990 | Baumann et al. . |
| 4,976,852 | 12/1990 | Janik et al. . |
| 5,017,285 | 5/1991 | Janik et al. . |
| 5,020,610 | 6/1991 | Lyon et al. . |
| 5,084,170 | 1/1992 | Janik et al. . |
| 5,244,571 | 9/1993 | Church et al. . |

FOREIGN PATENT DOCUMENTS

| | | |
|---|---|---|
| 1909130 | 2/1969 | Germany . |
| 333469 | 12/1935 | Italy . |

*Primary Examiner*—Matthew O. Savage
*Attorney, Agent, or Firm*—Christopher H. Hunter

[57] ABSTRACT

A filter element for a fuel filter includes an outer, coalescing filter media and an inner, water-absorbing filter media. The outer media normally filters or separates particles from the fuel system and coalesces water in the fuel. As the outer media degrades through use and water penetrates to the inner media, the inner media absorbs the water to act as a back-up for the outer filter media. As the inner media absorbs water, the inner media expands to restrict the fuel flow therethrough. At a predetermined pressure differential across the inner media, a by-pass device in the inner filter media opens or otherwise allows fluid from the outer filter media to bypass the inner filter media. Although the by-pass device provides a fluid path around the inner media, the outer media maintains its particle filtration efficiency of the fuel at a high level. Further, the structure of the filter element is such that the outer media and inner media maintain water separation at an acceptable level, even when the outer media degrades and the inner media reaches saturation, at least until the spent filter element can be replaced.

35 Claims, 5 Drawing Sheets

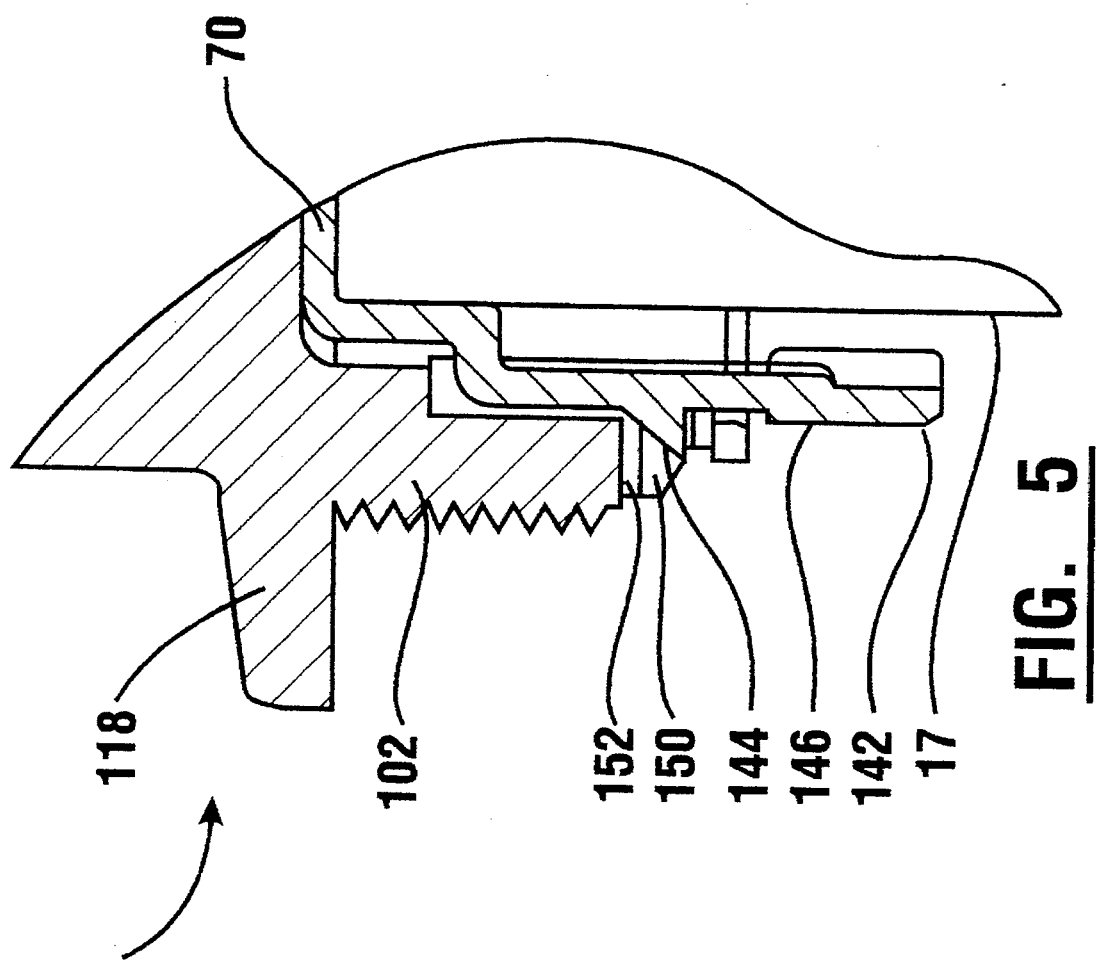
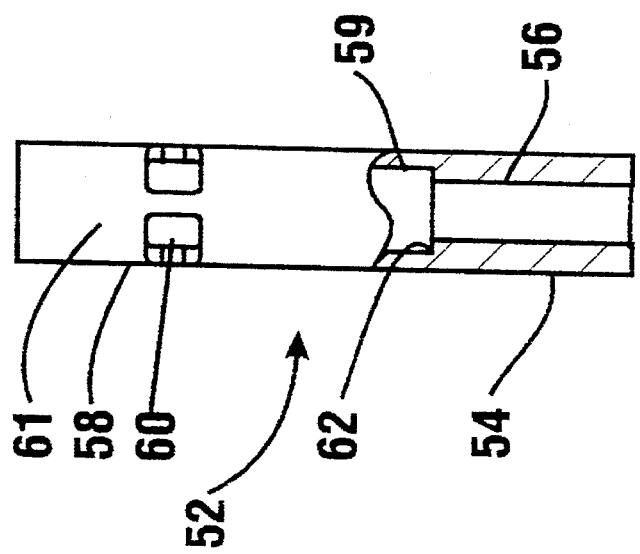

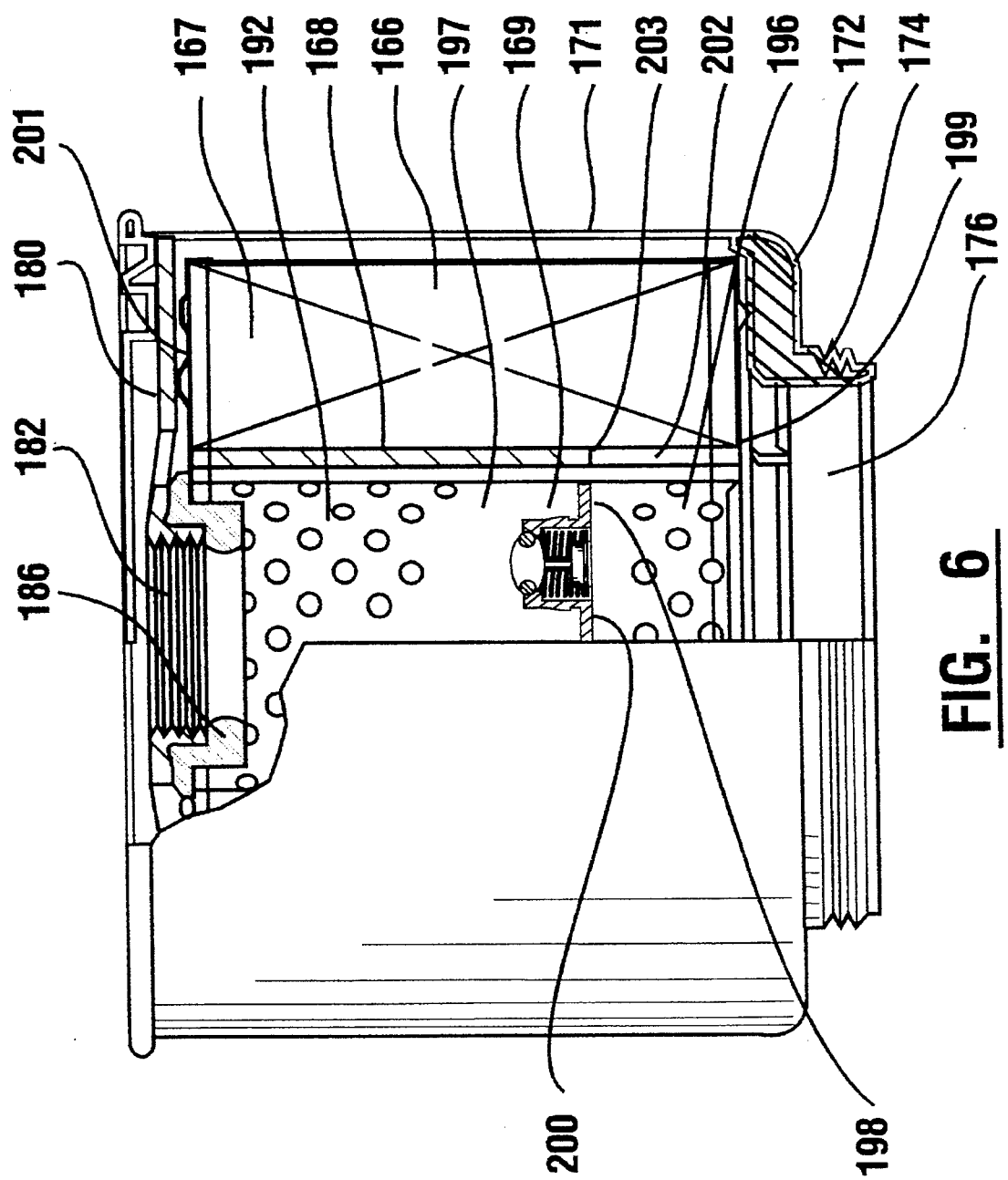

FUEL FILTER ASSEMBLY WITH DUAL FILTER MEDIA AND BY-PASS DEVICE

FIELD OF THE INVENTION

This invention relates to fluid filters. Specifically, this invention relates to a replaceable filter element with dual filter media and a by-pass device for filtering fuel, such as diesel or gasoline fuel, and to an assembly which includes the filter element.

BACKGROUND OF THE INVENTION

Many types of fuel filters are known in the art. A popular type of fuel filter construction for self-propelled vehicles is one that has a housing which encloses a replaceable filter element. Fuel used to power the self-propelled vehicle, such as diesel or gasoline fuel, is cleansed of impurities as it passes through filter media in the filter element. The filter media captures many of the impurities that are removed from the fuel. Other impurities collect on the surface of the media and fall downward into a bottom area of the filter housing from where they may be periodically removed through a drain valve. Such a fuel filter is shown in applications U.S. Ser. No. 07/888,688, filed May 22, 1992 for "Fuel Filter Assembly with Reversible Element"; and U.S. Ser. No. 08/131/824 filed Jul. 27, 1993 for "Fuel Filter Element", which are assigned to the assignee of the present invention.

Through use, the filter media can become dirty and clogged. When the filter media becomes clogged, resistance to flow increases and the filter element must be replaced. Indicators such as pressure and water sensors have been used which provide the operator with an indication that a filter element needs to be replaced. However, since the self-propelled vehicle is not always in a position or location to be stopped and the filter element replaced, devices have been developed for allowing the fuel filter to continue operating in at least a reduced capacity until an appropriate time and location are found to replace the element.

One such filter which prolongs the use of the vehicle has a by-pass valve in the filter element which opens at a predetermined pressure to allow fuel to flow around a clogged filter media. This type of filter is shown in U.S. Pat. Nos. 4,322,290 and 4,246,109. The by-pass valve in the filter element opens a fuel flow path which entirely circumvents the clogged filter media. While this type of fuel filter enables a fuel system to remain in operation, the fuel which passes through the by-pass valve is entirely unfiltered and can adversely effect the fuel system.

An improvement in this type of fuel filter is shown in U.S. Pat. Nos. 2,998,138; 3,331,509 and 4,038,189. In these patents, a second filter media, separate from the first filter media, is provided in the flow path from the by-pass valve. The back-up filter media is not normally in the fuel flow path and hence is not used when the primary filter media is functional. The second filter media captures at least a minimal amount of impurities in the fuel until the filter element can be replaced.

Another improvement in this type of filter is shown in U.S. Pat. Nos. 3,000,505; 3,229,817; and 4,437,986. In these patents, fuel passing through the primary filter media also passes through a secondary filter media during normal operation. For example, in U.S. Pat. No. 3,000,505, the fluid normally passes through an outer wire cloth filter with relatively small pores and then through an inner metal edge filter with relatively larger pores. Fluid is primarily filtered by the outer filter until the outer filter becomes clogged. At this point, a slidable sleeve valve activates to provide a fluid flow around the clogged outer filter directly to the inner filter. Similarly, in U.S. Pat. No. 3,229,817, fluid flows through a central passage radially outward through a coalescing medium, and then upward through a wire mesh separating screen. The coalescing medium causes water in the fuel to bead and fall downward into a lower chamber. If the coalescing medium becomes clogged, a spring-biased ball-valve open a fuel flow path around the coalescing medium so that the fuel flows directly to the separating screen.

Finally, in U.S. Pat. No. 4,437,986, fuel flows radially inward through an outer coalescing medium which causes most of the water in the fuel to coalesce and fall downward into a sump. Fuel then flows through an inner separating membrane which is repellant to water and completes the separation of the water from the fuel. Wax crystals plugging the inner separating membrane increase the pressure differential across the membrane and cause a relief valve to open, which opens a flow path around the inner membrane.

While the above-described filters provide certain advantages for maintaining operation of the fuel system when a filter element becomes clogged or otherwise unusable, the present inventor has determined that further improvements are necessary for the fuel filter assembly. That is, the inventor has determined that the primary media in certain filter elements may degrade under certain conditions. For example, when the primary media is a water-coalescing media (i.e., one that causes water droplets in the fuel to bead on the outer surface of the media and fall downward into a catch basin or sump), the coalescing media can be susceptible to certain contaminants in the fuel, such as tar or asphaltenes. These contaminants are surfactants which can cause the primary media to absorb or become wetted with the water in the fuel, rather than coalescing the water. The water can eventually permeate the primary media and enter the fuel system. Under such conditions, the water-separating capabilities of the filter element can be quickly reduced, which can affect certain components in the fuel system (e.g., fuel injection equipment), without adequate warning to the operator.

The inventor therefore believes that there is a demand in the industry for a further improved type of fluid filter assembly which continues to separate and filter impurities in the fuel when exposed to contaminants and which adequately warns the operator of water passing through the filter element into the fuel system.

SUMMARY OF THE INVENTION

It is therefore an object of the present invention to provide an improved fluid filter assembly for gasoline and diesel fuel which continues to separate and filter impurities in the fuel when the filter element is exposed to contaminants such as tar and asphaltenes, and which warns the operator that the filter element needs to be replaced when water begins to pass through the filter element to the fuel system.

The improved fuel filter assembly includes a replaceable filter element with dual filter media and a by-pass device disposed within a filter housing. The dual filter media includes an outer, primary filter media and an inner, secondary filter media. The outer primary media is formed from a water-coalescing medium, while the inner secondary media is formed from a dimensionally-expanding, water-absorbing medium. The primary and secondary media are each arranged in the form of a sleeve or tube. The primary media is located around the secondary media and is concentric therewith. An annular gap is provided between the primary media and the secondary media for fuel flow therebetween.

Input and output flow paths are provided in the housing such that the fuel flows radially inward through the primary media to the secondary media. The primary media has a particle filtration efficiency which normally filters or separates substantially all the particles of a predetermined micron size in the fuel passing through the filter element. Further, the primary media coalesces water in the fuel, which beads and falls downward into a collection sump. The filtered fuel then flows radially inwardly through the secondary media and passes through to a central perforated tube. The secondary media normally allows the fuel to pass through the filter element without restriction.

If the primary media becomes degraded from contaminants such as tar or asphaltenes, and water begins to permeate to the secondary media, the secondary media absorbs the water. The secondary media initially prevents the water from entering the fuel system. As the secondary media absorbs water in the fuel, the secondary media expands and begins to restrict the fuel flow through the filter element, which increases the pressure differential across the secondary media. When the pressure differential across the secondary media reaches a predetermined level, a pressure sensor provides a remote signal to notify the operator that the filter element should be replaced. Additionally, the by-pass device opens or otherwise allows fluid to circumvent the clogged secondary media such that fuel continues to be supplied to the fuel system at an appropriate level.

According to one embodiment of the present invention, the by-pass device is disposed in the inner, water-absorbing filter media and extends radially inward through an opening in the central perforated tube. According to another embodiment of the invention, the by-pass device is provided in a lower central perforated tube and extends axially upward into an upper central perforated tube. The by-pass device preferably comprises a by-pass valve having a spring-biased valve member which opens when a predetermined pressure differential is present across the secondary media. Alternatively, the by-pass device can comprise a device having an unobstructed orifice of predetermined size. In any case, the by-pass device provides a sufficient fluid flow path circumventing the secondary media when the fluid reaches the predetermined pressure.

When the pressure differential across the secondary media reaches the predetermined level and fuel is circumventing the secondary media, the particle-separating capabilities of the filter element remain at a high level because the fuel is initially passing through the primary filter media. The particle-separating capabilities of the primary media are not susceptible to contaminants such as tar or asphaltenes and so the primary media continues to filter or separate substantially all the particles in the fuel. Further, the water-coalescing capabilities of the primary media and the water-absorbing qualities of the second media remain at a sufficient high level such that only a minimum amount of water in the fuel is allowed to pass into the fuel system until the filter element is replaced.

Thus, the present invention provides a filter element for a fuel filter assembly which continues to filter or separate impurities in the fuel and allows prolonged use of the filter element even when the primary media in the filter element is exposed to contaminants such as tar or asphaltenes, and which provides the operator with a warning that the spent filter element needs to be replaced.

Further features and advantages of the present invention should be further apparent from the following detailed description and the accompanying drawings.

BRIEF DESCRIPTION OF THE DRAWINGS

FIG. 3 is a partially-sectioned side view of a flow control element for the filter element;

FIG. 5 is a cross-sectional enlarged view of an alternative embodiment of the latching portion of the filter element of FIG. 1; and FIG. 6 is a cross-sectional view of an alternative embodiment of the fuel filter assembly.

DETAILED DESCRIPTION OF THE PREFERRED EMBODIMENT

Figure 1:
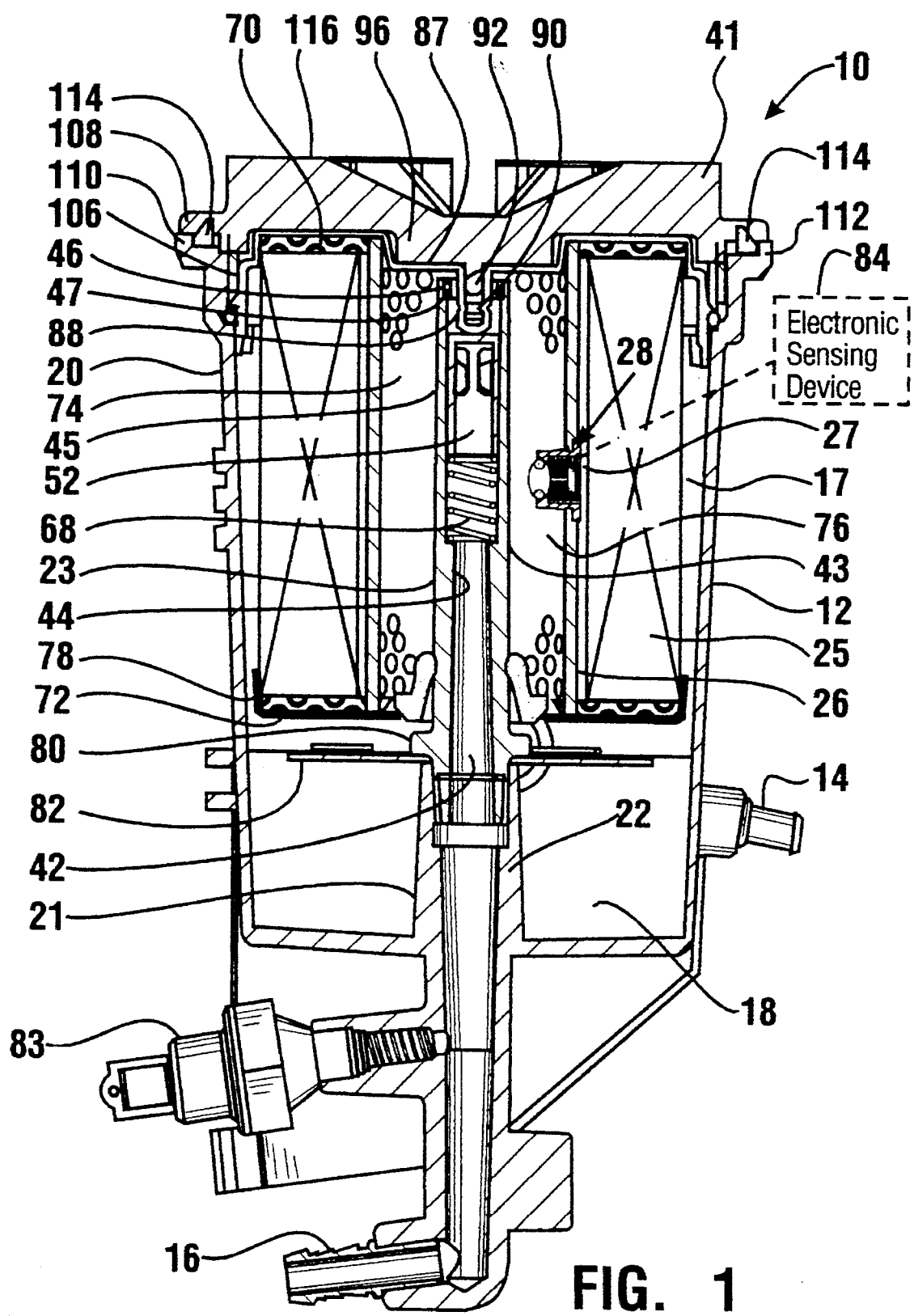
FIG. 1 is a cross-sectional view of the fuel filter assembly having a filter element constructed according to a first embodiment of the present invention.

Referring to the drawings, and initially to FIG. 1, a first embodiment of the fuel filter assembly is indicated generally at 10. The fuel filter assembly includes a generally cylindrical outer housing 12 with an inlet port 14 and an outlet port 16. The housing is designed to enclose a replaceable filter element or cartridge, indicated generally at 17. The housing for the filter element of the present invention can take many forms. One type of housing appropriate for the present invention is described in detail in U.S. Ser. No. 08/121,803 filed Sep. 15, 1993, for "Fuel Filter Assembly with Replaceable Element", which is incorporated herein by reference. The housing described in this copending application is the preferred form of housing for the present invention, and will be described herein. However, other forms of the housing, such as a "spin-on" type housing, can likewise be used with the present invention. These other types of filter housings should be well know to those of ordinary skill in the art.

In any case, inlet port 14 in the housing is in direct fluid communication with a chamber 18. Chamber 18 is a generally cylindrical chamber having a circular opening (not separately shown) at its upper end 20. Outlet port 16 is in direct fluid communication with an axially-extending standpipe 21. Standpipe 21 includes a lower standpipe portion 22 and an upper standpipe portion 23 which are fluidly connected together such as by a threaded connection. Standpipe 21 is generally centered in chamber 18.

The replaceable filter element 17 is removably mounted in chamber 18. Filter element 17 includes an outer sleeve or annulus of a first or primary filter media 25. The primary filter media is in generally surrounding relation to standpipe 21. Filter element 24 also includes an inner sleeve or annulus of a secondary filter media 26 disposed between the primary media 25 and the standpipe 21. The secondary media is surrounded by, and is concentric with, the primary media. An annular gap, indicated at 27, is provided between the primary media 25 and the secondary media 26 for fluid flow, as will be described herein in more detail.

The primary media 25 is a coalescing media which separates or filters particles in the fuel passing through the media and coalesces water in the fuel on the exterior surface of the media. As the water droplets form, they fall downwardly and are collected in cavity 18. The primary media is preferably a cellulose medium treated with silicon, and preferably has an average particle filtration efficiency of 98% removal of 7 micron particles. The media also preferably has between 90 and 94 pleats, and a media area of 550 sq. inches. Further, the primary media preferably has a thickness of about 27–31 mils; a Frazier air flow of 6.5–6.8 cfm; a stiffness or 4968–5779 mgs; and a tensile strength of 35.0–42.2 lbs/in. (cured). The structure and composition of the primary media can vary of course depending upon the particular application. One coalescing media appropriate for the present invention is commercially available from Hollingsworth and Vose, of New York, under the mark/designation 2254.

The secondary media 26 is a water-absorbing media. The water-absorbing media dimensionally expands and restricts the fluid flow therethrough when it absorbs water. The secondary media is formed from a material which blocks fluid flow therethrough when saturated with water. The secondary media is preferably a multilayer, pleated fiberglass/cellulose medium, and preferably has a (non-wetted) mean flow pore size of 12 microns. The secondary media also preferably has a thickness of about 0.070 inches; Frazier air flow of 35.1 cfm; stiffness of 10100 mgs; and tensile strength of 28 lbs/in. (cured). The particular structure and composition of the secondary media can also vary depending upon the particular application. One water-absorbing media appropriate for the present invention is commercially available from Ahlstrom Filtration, Inc., of Chattanooga, Tenn. under the mark/designation 4P-CEM.

In use, fluid flows radially inward through the primary filter media 25 to the secondary filter media 26. The primary media has a particle filtration efficiency which filters or separates substantially all the particles of a specified size passing through the filter element. The secondary media normally does not provide particle separation or filtration after the fuel passes through the primary media because of the larger median pore size of the secondary media. Further, the primary media normally does not absorb water in the fuel as the water normally coalesces on the outside surface of the primary media and falls downward into cavity 18. During optimum performance of the filter element, that is when there are no degrading contaminants in the fuel and the primary filter media is fresh, the secondary media does not restrict fuel flowing therethrough.

When the primary media is exposed to degrading contaminants such as asphaltenes or tar, the water-coalescing capabilities of the primary media can be reduced. As described above, the tar and asphaltenes are surfactants which cause the water to permeate or wet the primary media. If the primary filter media is exposed to these contaminants, water in the fuel can permeate the primary media and pass to the secondary media. If the water passes into the secondary media, the secondary media initially absorbs the water in the fuel, and prevents the water from entering the fuel system. Thus, as the coalescing capabilities of the primary media degrade through exposure to tar and/or asphaltenes, the secondary media provides back-up water-absorbing capabilities for the fuel filter to maintain the overall water-separating capabilities of the filter element at a high level. The particle filtration or separation capabilities of the filter element are maintained at a high level because these qualities of the primary media are generally not affected by the presence of tar or asphaltenes.

As the secondary media absorbs water in the fuel, the fuel flow through the secondary media becomes restricted and the pressure differential across the secondary media increases. At a predetermined pressure differential, a remote signal is sent to the operator to notify the operator that the filter must be replaced. The means for sensing the pressure differential will be described herein in more detail. Thus, as the coalescing properties of the primary filter media degrade through use, the secondary media provides a back-up water-absorbing function which prevents water from entering the fuel system and which provides a simple means for notifying the operator of a filter change.

The present invention also provides a means for circumventing the second media when the secondary media becomes clogged such that fuel continues to be supplied to the fuel system. To this end, a by-pass device, indicated generally at 28, is mounted along the axial length of secondary media 26 and extends radially inward toward standpipe 21. The by-pass device 28 can be is a by-pass valve as illustrated in FIG. 2A. In this embodiment, the by-pass valve includes a valve body 29 having an outwardly-extending annular attachment flange 30 at one open end. The valve body is disposed in an annular orifice 31 formed in the secondary media 26 and attachment flange 30 is located within an annular counterbore 32 formed around the periphery of orifice 31. The valve body is retained within the annular orifice by attachment flange 30 abutting one side of the secondary media and shoulder 33 formed in the valve body abutting the other side of the second media.

The valve body also includes an inwardly-projecting annular lip 34 formed at the other open end of the valve body. The inwardly-projecting lip has an inner flat surface 34a which serves as a stop for one end of a compression spring 35. Spring 35 extends around a valve member 36 and biases the base 37 of valve member 36 inwardly, away from the lip. The valve member 36 also includes an annular valve head 38, and a stem 39 which interconnects base 37 and head 38. Head 38 includes an O-ring-type seal 40 surrounding the head which normally seats against the outer sloped surface 34b of lip 34 to seal the opening of the valve body. The by-pass valve 28 is formed of appropriate durable material using conventional techniques.

When fluid pressure increases within the interior of the valve body, the pressure forces the valve head 38 axially outward, away from the valve seat 34b, to provide a fluid path through the valve body. The pressure level that the by-pass valve opens is preferably about 7 in. Hg, which has been determined to be about the pressure at which the secondary media disclosed previously is nearing saturation. The cracking pressure of the valve can be set at a predetermined level for a particular application by, e.g., adjusting the spring force.

Figure 2B:
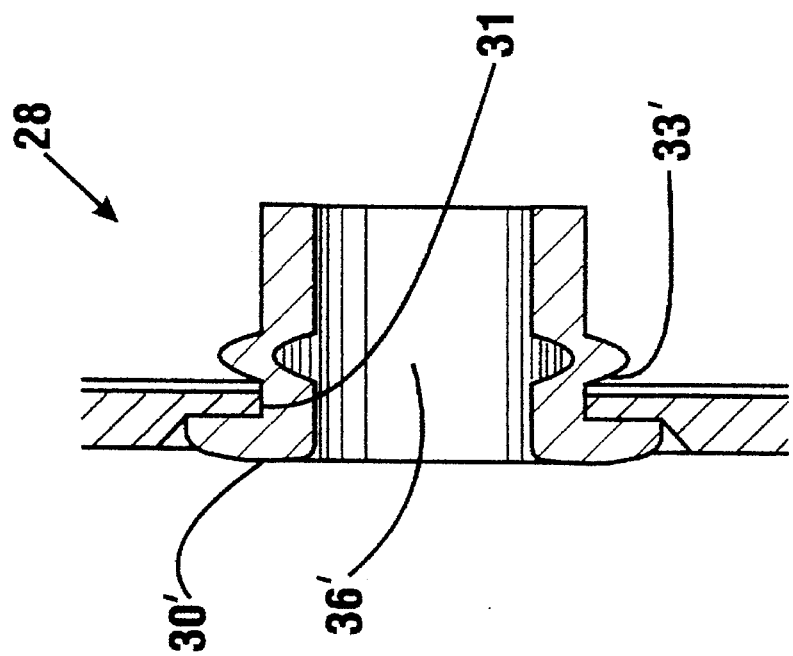
FIG. 2B is a cross-sectional, enlarged view of another embodiment of the bypass device for the filter element shown in FIG. 1.
Figure 2A:
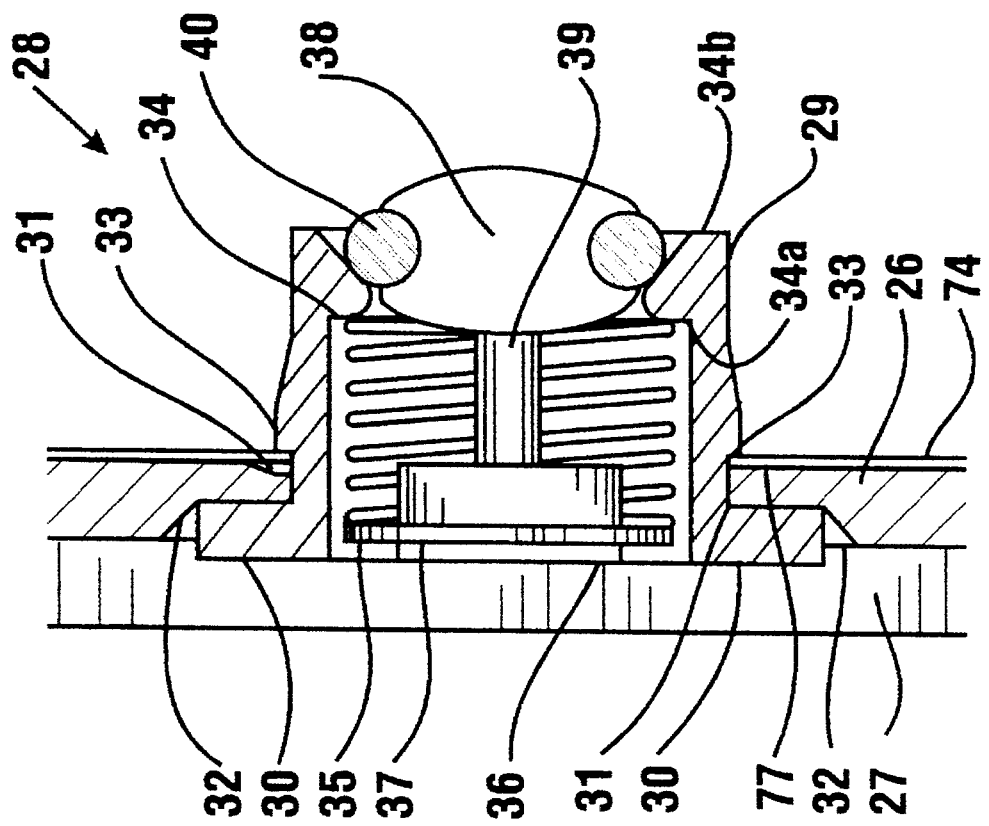
FIG. 2A is a cross-sectional enlarged view of one embodiment of the by-pass device for the filter element shown in FIG. 1.

An alternative embodiment of the by-pass device is illustrated in FIG. 2B. In this embodiment, the by-pass device is indicated at 28' and comprises a rivet-type device having an attachment flange 30' and shoulder 33' to retain the valve body 29' within the annular orifice 31, as in the first embodiment. In this further embodiment, however, an unrestricted orifice 36' is formed axially through the body 29' of the by-pass device. The orifice has a predetermined inside diameter which is large enough to allow enough fluid to circumvent the clogged secondary media to maintain operation of the fuel system, but which is small enough such that the pressure differential will increase across the secondary media for sensing a clogged filter element. The appropriate orifice diameter can be determined by one of ordinary skill using simple experimentation. The by-pass device 28' is also formed of appropriate durable material using conventional techniques.

In either of the embodiments of the by-pass device described above, the location of the by-pass device along the axial length of the secondary media 26 is not important. The gap 27 between the primary and secondary media allows the fuel to flow axially between the two media to the by-pass device, regardless of its location.

Thus, as described previously, when the fuel flows through the secondary media is restricted as the secondary media absorbs water in the fuel, the fluid pressure within the filter element increases. At the predetermined pressure differential across the secondary media, the remote signal is sent to the operator to warn of a clogged filter element and the by-pass device opens or otherwise allows fluid to bypass the clogged secondary filter media. While the fuel does not flow through the secondary filter media at this point, the fuel has initially passed through the primary media, and hence particle filtration or separation is maintained at a high level. Further, it has been determined that a certain level of water-coalescing/absorption is maintained by the primary and secondary media even though the primary media might be slightly degraded by the contaminants, and the secondary media might be close to saturation. This is because the fuel is still in contact with both the primary media and secondary media by passing through the primary media and flowing alongside both the primary media and secondary media in gap 27. Thus, although the bypass device is open, the fuel does not enter the fluid system entirely unfiltered by the filter element, but rather at the same high level of particle filtration efficiency, and at least close to the same level of water separation efficiency, as when the filter element was fresh, regardless of additive or asphaltene degradation of the primary filter media.

Turning now to the structure of the fuel filter housing illustrated in FIG. 1, the fuel filter assembly further includes a cover 41 at one end adapted for enclosing the filter element 17 within chamber 18. Cover 41 is further adapted for selectively latching the cover and filter element 17 together, as will be explained later.

The standpipe 22 of the assembly includes an internal flow passage 42 in fluid communication through the housing with outlet port 16. The standpipe 22 has a cylindrical wall 43 with a cylindrical interior surface 44 adjacent its upper end 24. A pair of radially-extending openings 45 extend through wall 43 of the standpipe. The standpipe also includes an actuator opening 46 in its top end. Actuator opening 46 is bounded by a guide ring 47.

A flow element 52 is mounted for longitudinal movement in standpipe 22. As shown in FIG. 3, flow element 52 has a cylindrical or tubular configuration with a lower portion 54 having an axially-extending bore 56. Element 52 further includes an upper portion 58 with an axially-extending bore 59 which is fluidly connected with lower bore 56. Radial flow cavities 60 are formed in upper portion 58 to direct fluid radially into axial bore 59. Upper portion 58 also includes a flat, solid, top portion 61. A shoulder 62 is formed between lower portion 54 and upper portion 58.

Flow element 52 is sized so that cylindrical wall 56 and top portion 61 are in close-fitting, movable relation with interior surface 44 of standpipe 22. The flow element 52 is thereby made longitudinally movable inside the standpipe. A spring 68 (FIG. 1) mounted in standpipe 22 serves as biasing means for biasing the flow element in the outward direction toward actuator opening 46. Guide ring 47 serves to prevent flow element 52 from passing out of the standpipe through the actuator opening 46.

Flow element 52, standpipe 22, and their respective flow openings, operate together as valve means to control fluid communication between the chamber inside the housing and the interior of the standpipe. When flow cavities 60 of upper portion 58 of the flow element are aligned with openings 45 of the standpipe as shown in FIG. 1, the flow passages 45 are open, which enable fluid to be admitted to the standpipe. Fuel flows into the standpipe and passes through flow cavities 60 in the flow element, through axial bores 56, 59, and eventually to the outlet port 16 of the assembly. However, when the flow element 52 is disposed upward from the position shown in FIG. 1, the lower portion 54 of the flow element is disposed adjacent and in blocking relation to openings 45. As a result, flow between the standpipe and the surrounding chamber is blocked.

Filter element 17 further includes a first imperforate end cap 70 at its upper end, and a second imperforate end cap 72 at its lower end. The end caps 70 and 72 are attached in fluid tight relation to the inner and outer sleeves of filter media 25, 26 in a conventional manner using potting compound or similar adhesive material. The filter element further includes a perforated tube 74 disposed radially inward and adjacent to the secondary media 26. The perforated tube is preferably formed from a strip of 0.015" steel rolled which is welded into a tube. The perforations are preferably 0.25" apart (center-to-center), and are 0.125" in diameter. The perforated tube provides support for the primary and secondary media and prevents collapse due to pressure forces. The perforated tube 74 bounds an area 76 inside the secondary media 26 adjacent to the standpipe. An annular opening 77 (FIG. 2A) is formed in the wall of the perforated tube to receive the radially-projecting by-pass device 28. The opening in the tube 74 is dimensioned to fit between the orifice 31 in the secondary media 26 and the shoulder 33 (FIG. 2A) or 33' (FIG. 2B) of the by-pass device.

Lower end cap 72 includes a central opening (not separately shown) which accepts standpipe 22 therein. An annular seal 78 extends across the opening to the outer surface of the standpipe to seal area 76 against infiltration of contaminates. An enlarged area 80 of the standpipe serves to hold a disc-shaped heater plate 82 in position between the enlarged area 80 and the lower portion 23 of the standpipe. Heater plate 82 is adapted for mounting electronic heating elements such as PTC heaters thereon. Such heaters are useful for heating fuel in cold temperatures, particularly diesel fuel. While not shown, a conventional temperature sensor is provided in the fuel flow path to sense the temperature of the fuel.

The housing also includes a vacuum sensor/switch 83 as one type of means for indicating that the secondary filter media is clogged. The vacuum sensor/switch senses the pressure of fuel that is passing to the outlet port 16. When the sensor/switch 83 senses a high vacuum pressure across the secondary filter media, sensor/switch 83 provides a remote electrical signal to the operator to indicate that the filter element is clogged and must be replaced. The pressure level at which the sensor/switch sends such a signal can be varied depending upon the particular application, but is typically set at the level at which the secondary filter media is saturated, or nearly saturated, with water. For the secondary media disclosed previously, this pressure level is about 7 in. Hg. The means for sensing a clogged filter element could also comprise other conventional devices, such as electronic devices which sense the movement of the by-pass valve ball. These other types of devices should be well known to those of ordinary skill in the art.

Figure 4:
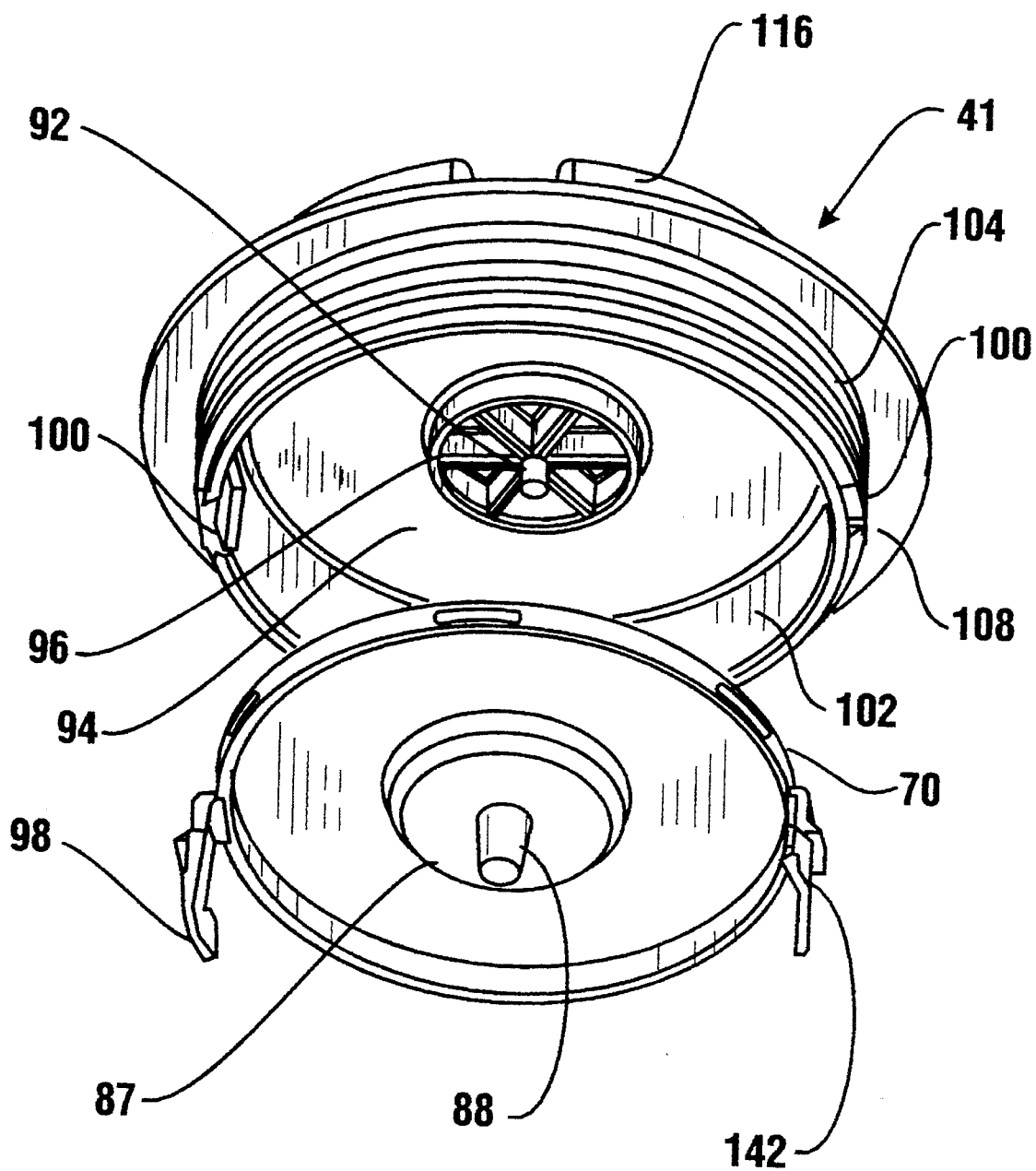
FIG. 4 is an isometric view of the cover for the fuel filter assembly and an upper end cap of the filter element shown in FIG. 1.

Referring now to FIGS. 1 and 4, upper end cap 70 includes a centrally-positioned, cylindrical well area 87. A first projection 88 extends longitudinally inward from the bottom of the well area. As shown in FIG. 1, first projection 88 is adapted for extending through actuator opening 46 to engage flow element 52. A first recess 90 is positioned in overlying relation on the upper surface of the end cap above projection 88. A cover projection 92 is positioned centrally on an interior cover top wall 94 of cover 41 (see FIG. 4). Cover projection 92 is adapted to be received in recess 90 and serves as support means for supporting projection 88. While cover projection 92 is adapted for adding strength to projection 88, it is of insufficient length to engage flow element 52.

Cover 41 also includes a circular centering wall 96 which extends in surrounding relation to cover projection 92. Centering wall 96 is sized to be accepted into the well area 87 on first end cap 70.

Cover 41 further includes an outwardly-threaded wall portion 104 which is adapted for engaging inwardly-threaded wall portion 106 (FIG. 1) adjacent the opening to chamber 18. Cover 41 further includes a radially-extending flanged portion 108 which is adapted for engaging a lip portion 110 of the housing. As shown in FIG. 1, lip portion 110 includes a circumferentially-extending recess 112 for housing a resilient seal 114. Seal 114 holds the cover and the housing in fluid tight relation when the cover is installed thereon. Cover 41 also includes outwardly-extending wing projections 116 which facilitate manually holding and turning the cover.

As shown in FIGS. 4 and 5, first end cap 70 further includes a pair of oppositely-facing latching fingers 142. Latching fingers 142 extend axially downward from diametrically opposite sides of cap 70 and are adapted for engaging recesses 100 in a downwardly-extending cover wall 102 of cover 41. Latching fingers 142 include tapered, outward-extending locking portions 144 and arcuately-extending, manually engageable flats 146.

Cover wall 102 bounds an interior recess into which first end cap 70 and the adjacent area of filter element 17 is accepted. The outer surface of wall 102 is threaded and engages the threaded portion 106 of housing 12 (FIG. 1). Wall 102 also includes, in cross-section, a tapered end portion 150. Tapered end portion 150 includes a pair of openings 152 therethrough. Openings 152 are sized for accepting the locking portions 144 of latching fingers 142 therein.

The latching fingers 142 and openings 152 provide for engagement of cover 118 and filter element 128. To engage the element and cover, upper end cap is pushed into the recess bounded by wall 102 with the openings 152 aligned with locking portions 144. As the element is pressed into the recess, the fingers are deformed inward until the locking portions snap into place in the openings. The cover may then be used to install the element in the housing in the same manner as described previously.

Although not shown in FIG. 1, the fuel filter assembly of the present invention also includes a drain valve of conventional construction which is adapted for enabling the removal of contaminants that collect in a lower portion of chamber 18. Such drain valves, which are well known in the prior art, may be periodically opened to release collected contaminants, which most commonly include water and dirt particles.

In operation, fuel flows into inlet port 14 and enters chamber 18. Fuel then passes through primary and secondary media 25, 26 of the filter element 17 and is cleansed of impurities. The clean fuel travels to area 76 adjacent to the standpipe and passes through openings 45. The fuel then passes through the flow cavities 60 of the flow element 52 through the flow passage 42 of the standpipe, and out through outlet port 16.

A filter element change is accomplished by turning cover 41 and removing cover 41 and filter element 17 as a unit. In so doing, flow element 52 blocks openings 45 in standpipe 21. The filter element 17 is then separated from the cover, a new filter element is attached, and the unit is replaced. A more detailed description of the method of removing and replacing a spent filter element is described in U.S. Application Ser. No. 08/121,803.

A further embodiment of the filter element of the present invention is shown in FIG. 6. In this embodiment, the filter element, designated at 166, again includes a primary water-coalescing filter media 167, a secondary water-absorbing filter media 168, and a by-pass device 169. The primary media, secondary media and by-pass device are constructed of the same material and in substantially the same manner as discussed previously. The filter element 166 is illustrated as being mounted in a conventional "spin-on" filter housing 171 such as the type disclosed in U.S. Pat. No. 4,997,555, however the filter element could just as well be mounted in the housing shown in FIG. 1. In any case, housing 171 has a lower end cap 172 with a downwardly-projecting attachment flange 174. Flange 174 has a central inlet opening 176 and outwardly-directed threads. The housing 171 has an upper end cap 180 with a central outlet opening 182 and inwardly-directed threads. A fluid seal 186 is disposed around outlet opening 182 and is designed to seal against an outlet pipe or conduit (not shown) to the fuel system.

In this embodiment of the invention, the filter element is modified such that the by-pass device 169 is located centrally within a tube assembly, indicated generally at 192. The tube assembly includes a lower central perforated tube 196 disposed toward the bottom of the filter housing 171, and an upper central perforated tube 197 disposed toward the top of the housing, co-axial with the lower tube. The primary media and secondary media surround the upper and lower tubes, as in the previous embodiment. Lower tube 196 includes a flat, solid end cap or wall 198 at its upper end, and at its lower end, is closed by and abuts lower filter element end cap 199. Upper tube 197 has an open lower end 200 and an upper end which abuts upper filter element end cap 201 and is received around outlet opening 182.

By-pass device 169 is located within an orifice (not shown) in the end cap 198 of the lower tube 196 and is secured therein such as in the manner described previously. The by-pass device projects axially upward through open end 200 of upper tube 197. In this embodiment of the invention, the secondary media 168 surrounds the perforated tube assembly 192 down to the level of the lower tube 196. A small annular orifice 202 is thus formed between the lower edge 203 of secondary media 168 and lower filter element end cap 199. Fuel passing inward through primary media 167 can pass directly through orifice 202 in the lower tube 198 without passing through secondary media 168, although the fuel cannot pass upwardly into upper tube 197 until by-pass valve 169 is open.

During operation of the filter element of this embodiment, fuel to be filtered enters inlet opening 176 and is directed upward around filter element 166 between the filter element and housing 171. The fuel then passes radially inward through primary media 167 and secondary media 168 into perforated upper tube 197. Water normally coalesces on the outer surface of primary media 167 and falls downward, while particles are filtered or separated within the media. If tar or asphaltenes degrade the water-coalescing capability of primary media 167, the secondary media 168 begins to absorb water in the fuel to prevent the water from entering the fuel system. As the secondary media absorbs water, the fuel flow is restricted through the secondary media. Fluid pressure thereby increases within the filter element, including within the area bounded by the lower perforated tube 196. At the predetermined pressure differential across the secondary media (as described previously), a remote signal is sent to the operator to indicate the need for a filter change. By-pass device 169 in the lower tube also opens to provide a fluid path directly into upper tube 197, bypassing clogged secondary media 168.

It should be readily apparent that the by-pass device useful in this embodiment of the filter element could just as well be the by-pass valve illustrated in FIG. 2A, or the orifice-type device illustrated in FIG. 2B. Either by-pass device in this embodiment would operate in the same manner as described previously.

Thus, as described above, the present invention provides an improved filter assembly having a filter element with a dual media and a by-pass device which filters or separates impurities in fuel even when contaminants such as tar or asphaltenes are present. The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A fluid filter cartridge comprising:

a first filter media, said first filter media being a filter material having water coalescing and particulate removing capacities, wherein said first filter media has a particulate filtration efficiency of a predetermined percentage for predetermined micron size particles, said first filter media having an inlet side and an outlet side;

a second filter media, said second filter media being a water absorbing material which dimensionally expands when it absorbs water, wherein said second filter media has a water-saturated condition and a water-unsaturated condition, said second filter media normally having a particulate filtration efficiency for particles having a micron size which are larger than that of the first filter media when said second filter media is in said unsaturated condition, and when said second filter is in the saturated condition the secondary filter media substantially blocks fluid flow therethrough, said second filter media having an inlet side and an outlet side;

means defining a main fluid flow path extending between and establishing fluid communication between said outlet side of said first filter media and said inlet side of said second filter media; and means defining a bypass fluid flow path extending between and establishing fluid communication between said outlet side of said first filter media and said outlet side of said second filter media, whereby said second filter media is bypassed via said bypass fluid flow path when said second filter media is in said water-saturated condition.

2. The fluid filter cartridge as in claim 1, wherein when the water-coalescing capacity of said first filter media decreases with use, said second filter media (i) provides back-up water removal for the first filter media, and (ii) decreases the main fluid flow path between the first filter media and the second filter media.

3. The fluid filter cartridge as in claim 2, wherein said first filter media and second filter media are each in the form of a tube or sleeve, and said first filter media surrounds and is concentric with said second filter media.

4. The fluid filter cartridge as in claim 3, wherein said main fluid flow path is radial through the filter cartridge media.

5. The fluid filter cartridge as in claim 4, wherein the by-pass fluid flow path has a portion which is radial through the first filter media.

6. The fluid filter cartridge as in claim 5, wherein said first filter media and said second filter media define an annular space between the filter media, and the by-pass fluid flow path has a portion which is axial through said annular space.

7. The fluid filter cartridge as in claim 6, wherein said means defining a main fluid flow path further includes upper and lower end caps for the filter cartridge, one of said end caps abutting one end of each of said filter media, and the other of said end caps abutting another end of each of said filter media.

8. The fluid filter cartridge as in claim 2, wherein said means defining a bypass fluid flow path further includes a by-pass device for changing the fluid flow path from the main fuel flow path to the by-pass fuel flow path, said by-pass device being responsive to the fluid pressure differential across the second filter media.

9. The fluid filter cartridge as in claim 8, wherein the by-pass device comprises a spring-biased ball valve.

10. The fluid filter cartridge as in claim 8, wherein the second filter media includes an opening extending from its inlet side to its outlet side, and said by-pass device is mounted within the opening in the second filter media and interconnects the inlet side and the outlet side of the second filter media.

11. The fluid filter cartridge as in claim 8, wherein said first filter media and said second filter media are each arranged in the form of a tube or sleeve with the first filter media surrounding and being concentric with the second filter media, and wherein the by-pass device is mounted centrally interiorly within said first and second filter media.

12. The fluid filter cartridge as in claim 8, wherein the by-pass device consists essentially of an unobstructed orifice interconnecting the inlet side and the outlet side of the second filter media.

13. The fluid filter cartridge as in claim 12, wherein said second filter media includes an opening extending from its inlet side to the outlet side of the second filter media, and the by-pass device is mounted within the opening to interconnect the inlet side and the outlet side of the second filter media.

14. The fluid filter cartridge as in claim 12, wherein said first filter media and said second filter media are each arranged in the form of a tube or sleeve with the first filter surrounding and being concentric with the second filter media, and wherein the by-pass device is mounted centrally interiorly within said first and second filter media.

15. The fluid filter cartridge as in claim 2, further including a perforated tube extending centrally within and being surrounded by said first and second filter media, said means defining a bypass flow path further including means for providing a flow path circumventing said second media and establishing fluid communication between said first filter media and said perforated tube.

16. The fluid filter cartridge as in claim 2, further including a pressure sensing device which senses the pressure on the outlet side of the second filter media to provide a remote signal when the pressure reaches a predetermined level.

17. A fuel filter element, comprising:
   i) a first filter media, said first filter media having water-coalescing and particulate removing capacities, said first filter material having a particulate filtration efficiency of a predetermined percentage for predetermined micron size articles, said first filter media having an inlet side and an outlet side,
   ii) a second filter media, said second filter media being a dimensionally transforming media having a particle filtration efficiency of a predetermined percentage which changes when the second filter media is exposed to water, said second filter media normally having a particulate filtration efficiency for particles having a micron size which are larger than that of the first filter media when said second filter media is not exposed to water, and having a particulate filtration efficiency less than that of the first filter media when the second filter media is exposed to water, and said second filter media having an inlet side and an outlet side,
   iii) a bypass device providing a bypass flow path which circumvents the second filter media when the particle filtration efficiency of said second filter media changes when the second filter media is exposed to water,
   iv) means defining a main fluid flow path extending between and establishing fluid communication between said outlet side of said first filter media and said inlet side of said second filter media, and
   v) wherein said bypass fluid flow path extends through said by-pass device and extends between and establishes fluid communication between said outlet side of said first filter media and said outlet side of said second filter media.

18. The fuel filter element as in claim 17, wherein the pressure differential across the second filter media changes when the second filter media is exposed to water, and said by-pass device has a structure which is responsive to a change in pressure differential across the second filter media to change the flow path from the main fluid flow path to the by-pass fluid flow path.

19. The fuel filter element as in claim 18, wherein said first filter media and said second filter media each comprise tubular structures which are arranged in a concentric manner with respect to each other.

20. The fuel filter element as in claim 18, wherein said means defining a main fluid flow path further includes a first end cap enclosing a first end of said first and second filter media, and a second end cap enclosing a second end of said first and second filter media.

21. A fuel filter cartridge, comprising:
   ii) a primary filter media, said primary filter media having water coalescing and particulate removing capacities, said primary filter media having a particulate filtration efficiency of a predetermined percentage for predetermined micron size particles, said primary filter media having a tubular configuration with an inlet side and an outlet side,
   ii) a secondary filter media, said secondary filter media being a water absorbing material which dimensionally expands when it absorbs water, said secondary filter media normally having a particulate filtration efficiency of a predetermined percentage for particles having greater micron sizes than the primary filter media when the secondary filter media is not exposed to water, said secondary filter media having a tubular configuration with an inlet side and an outlet side, said secondary filter media being disposed within and concentric with said primary filter media such that the outlet side of said primary filter media is adjacent the inlet side of said secondary media,
   iii) means defining a main fuel flow path extending between and normally establishing fluid communication between said outlet side of said primary filter media and said inlet side of said secondary filter media,
   iv) a bypass device providing a bypass flow path which circumvents the secondary filter media when the secondary filter media dimensionally expands and the fuel pressure differential across the secondary media reaches a predetermined level,
   v) a sensor device which senses the predetermined level of fuel pressure on the outlet side of the secondary filter media, and
   vi) wherein said bypass fuel flow path extends through the bypass device and extends between and establishes fluid communication between said outlet side of said primary filter media and said outlet side of said secondary filter media.

22. The fuel filter cartridge as in claim 21, wherein said primary tubular filter member has a diameter that is larger than the diameter of the secondary tubular filter member such that an annular gap is defined between the outlet side of said primary filter member and the inlet side of said secondary filter member.

23. The fuel filter cartridge as in claim 22, wherein said bypass device is located axially along the length of said secondary filter media and extends radially inward toward a geometric axis of said secondary filter media.

24. The fuel filter cartridge as in claim 21, wherein said bypass device includes a flow blocking member disposed within said secondary tubular filter media to block fuel flow axially within the secondary filter media, and wherein said bypass device includes means mounted in said flow blocking member to provide a flow path circumventing said secondary filter media and said flow blocking member when the pressure differential across the secondary filter media reaches the predetermined level.

25. A fuel filter assembly, comprising:
   a housing with an inlet fuel port and an outlet fuel port, a filter element removably disposed within said housing, said filter element including
   i) an outer primary filter media, said primary filter media having water coalescing and particulate removing capacities, said primary filter media having a particulate filtration efficiency of a predetermined percentage for predetermined micron size particles, said primary filter media having a tubular configuration,
   ii) an inner secondary filter media, said secondary filter media being a water absorbing material which dimensionally expands when it absorbs water and prevents fuel flow through the secondary filter media, said secondary filter media normally having a particulate filtration efficiency of a predetermined percentage for micron size particles greater than that of the primary filter media when the secondary filter media is not exposed to water, said secondary filter media having a tubular configuration and being disposed within and concentric with said primary filter media such that the primary filter media is adjacent the secondary filter media, iii) a perforated tube disposed centrally within said housing and surrounded by said primary filter media and said secondary filter media, said central perforated tube providing a flow path from said primary and secondary media to one of said inlet and outlet ports, and iv) a bypass device providing a flow path which circumvents the secondary filter media and establishes a flow path between said primary filter media and said central perforated tube when the secondary filter media absorbs water and the pressure differential across the secondary filter media reaches a predetermined level;

v) wherein the housing includes means for defining a first flow path where fuel flowing in through the inlet port is directed around the outer periphery of the outer primary filter media, where the fuel can then flow radially inward through the outer primary filter media and then radially inward to the secondary filter media, and a second flow path where fuel flowing through the secondary filter media is directed toward the outlet port.

26. The assembly as in claim 25, wherein said bypass device is located within an opening formed in the secondary filter media and provides a flow path through the secondary filter media when the pressure differential across the secondary filter media reaches the predetermined level.

27. The assembly as in claim 25, wherein said central perforated tube includes a radially-extending wall which normally blocks fluid flow axially through the perforated tube, and said bypass device is located in an opening in said wall so as to provide a fluid path through the wall when the pressure differential across the secondary filter media reaches the predetermined level.

28. The assembly as in claim 25, further including a sensing device for sensing a pressure at the outlet fuel port, and means responsive to said pressure sensing device for providing a remote signal when the pressure at said outlet port reaches the predetermined level.

29. A fuel filter cartridge, comprising:

i) a primary filter media, said primary filter media having water coalescing and particulate removing capacities, said primary filter media having a particulate filtration efficiency of a predetermined percentage for predetermined micron size particles, said primary filter media having a tubular configuration with an inlet side and an outlet side, ii) a secondary filter media, said secondary filter media being a water absorbing material which dimensionally expands when it absorbs water, said secondary filter media normally having a particulate filtration efficiency of a predetermined percentage for particles having greater micron sizes than the primary filter media when the secondary filter media is not exposed to water, said secondary filter media having a tubular configuration with an inlet side and an outlet side, said secondary filter media being disposed within and concentric with said primary filter media such that the outlet side of said primary filter media is proximate the inlet side of said secondary media and an annular flow gap is provided between the primary filter media and the secondary filter media, wherein flow through the cartridge normally passes through the primary filter media, the annular flow gap and the secondary filter media when said secondary filter media is not exposed to water, and iii) a bypass device providing a bypass flow path which extends through the primary filter media and annular flow gap and circumvents the secondary filter media when the secondary filter media dimensionally expands and the fuel pressure differential across the secondary media reaches a predetermined level.

30. The cartridge as in claim 29, wherein said bypass device is disposed in an aperture formed in said secondary filter media.

31. The cartridge as in claim 29, further including a perforated tube disposed within said primary and secondary filter media, and said bypass device is disposed at least partially within said perforated tube.

32. A fuel filter assembly, comprising:

i) a housing with an inlet fuel port and an outlet fuel port, ii) a filter element removably disposed within said housing, said filter element including:

a) an outer primary filter media, said primary filter media having water coalescing and particulate removing capabilities, said primary filter media having a particulate filtration efficiency of a predetermined percentage for predetermined micron size particles, said primary filter media having a tubular configuration, b) an inner secondary filter media, said secondary filter media being a water absorbing material which dimensionally expands when it absorbs water and prevents fuel flow through the secondary filter media, said secondary filter media normally having a particulate filtration efficiency of a predetermined percentage for micron size particles greater than that of the primary filter media when the secondary filter media is not exposed to water, said secondary filter media having a tubular configuration and being disposed within and concentric with said primary filter media such that the primary filter media is adjacent the secondary filter media and an annular flow gap is provided between the primary and secondary filter media, and c) a perforated tube disposed centrally within said housing and surrounded by said primary filter media and said secondary filter media, said perforated tube providing a flow path from said primary and secondary media to said outlet port, wherein flow entering the inlet port is directed around the outer periphery of the outer primary filter media, radially inward through the outer primary filter media, radially inward through the secondary filter media and then radially inward to the perforated tube, and iii) a bypass device providing a flow path which allows fluid to flow from said inlet port radially inward through the primary filter media and the annular flow gap to the central perforated tube but which circumvents the secondary filter media when the secondary filter media absorbs water and the pressure differential across the secondary filter media reaches a predetermined level.

33. The assembly as in claim 32, further including a sensing device which senses a pressure at the outlet fuel port, and means responsive to said pressure sensing device for providing a remote signal when the pressure at said outlet port reaches the predetermined level.

34. The assembly as in claim 32, wherein said bypass device is disposed in an aperture formed in said secondary filter media.

35. The assembly as in claim 32, wherein said bypass device is disposed at least partially 14 within said perforated tube.

* * * * *

UNITED STATES PATENT AND TRADEMARK OFFICE
CERTIFICATE OF CORRECTION

PATENT NO. : 5,458,767
DATED : Oct. 17, 1995
INVENTOR(S) : Walter H. Stone

It is certified that error appears in the above-indentified patent and that said Letters Patent is hereby corrected as shown below:

Claim No. 17 appearing at Column 13, Line 20, the word "articles" should be "particles".

Signed and Sealed this

Sixteenth Day of January, 1996

Attest:

BRUCE LEHMAN

Attesting Officer    Commissioner of Patents and Trademarks